United States Patent
Brandt

(10) Patent No.: US 9,595,724 B2
(45) Date of Patent: Mar. 14, 2017

(54) BIPOLAR PLATE AND ELECTROCHEMICAL CELL COMPRISING SUCH A BIPOLAR PLATE

(71) Applicant: SIEMENS AKTIENGESELLSCHAFT, Munich (DE)

(72) Inventor: Torsten Brandt, Forchheim (DE)

(73) Assignee: Siemens Aktiengesellschaft, Munich (DE)

(*) Notice: Subject to any disclaimer, the term of this patent is extended or adjusted under 35 U.S.C. 154(b) by 355 days.

(21) Appl. No.: 14/385,411

(22) PCT Filed: Nov. 29, 2012

(86) PCT No.: PCT/EP2012/073917
§ 371 (c)(1),
(2) Date: Dec. 29, 2014

(87) PCT Pub. No.: WO2013/135322
PCT Pub. Date: Sep. 19, 2013

(65) Prior Publication Data
US 2015/0311539 A1    Oct. 29, 2015

(30) Foreign Application Priority Data
Mar. 13, 2012 (EP) ..................... 12159142

(51) Int. Cl.
*H01M 8/02* (2016.01)
*H01M 8/04* (2016.01)
*H01M 8/10* (2016.01)

(52) U.S. Cl.
CPC ....... *H01M 8/0263* (2013.01); *H01M 8/0228* (2013.01); *H01M 8/0254* (2013.01);
(Continued)

(58) Field of Classification Search
None
See application file for complete search history.

(56) References Cited

U.S. PATENT DOCUMENTS

| 6,849,351 | B2 | 2/2005 | Hartnack et al. |
| 8,158,299 | B2 | 4/2012 | Blank et al. |

(Continued)

FOREIGN PATENT DOCUMENTS

| DE | 102005057044 A1 | 6/2007 |
| DE | 102005057045 A1 | 6/2007 |

(Continued)

*Primary Examiner* — Jeremiah Smith
(74) *Attorney, Agent, or Firm* — Laurence Greenberg; Werner Stemer; Ralph Locher

(57) ABSTRACT

A bipolar plate for an electrochemical cell contains two plate elements between which a flow field has a flow inlet and a flow outlet. The flow field has coolant flowing through it. Each plate element has a contact plane for making contact with the respective other plate element and a plurality of first embossments project from the contact plane and face away from the other plate element. One of the plate elements has second embossments. Both the first and the second embossments have an aperture to the contact plane of the plate element. Flow channels are formed by the apertures by having the embossments of the two plate elements offset against one another such that each embossment only partially overlaps one embossment of the other plate element. The second embossments are smaller than the first embossments such that the flow channels are restricted in the second embossments.

13 Claims, 3 Drawing Sheets

(52) U.S. Cl.
CPC ....... *H01M 8/0258* (2013.01); *H01M 8/0267* (2013.01); *H01M 8/0297* (2013.01); *H01M 8/04029* (2013.01); *H01M 8/1018* (2013.01); H01M 8/0202 (2013.01); H01M 8/0247 (2013.01); H01M 8/0265 (2013.01); H01M 2008/1095 (2013.01); Y02E 60/50 (2013.01)

(56) References Cited

U.S. PATENT DOCUMENTS

| | | |
|---|---|---|
| 8,617,755 B2 | 12/2013 | Baschek et al. |
| 2003/0162078 A1 | 8/2003 | Kikuchi et al. |
| 2003/0194595 A1 | 10/2003 | Gibb et al. |
| 2004/0115514 A1* | 6/2004 | Iwase .................. H01M 8/0258 429/434 |
| 2005/0136306 A1 | 6/2005 | Sugiura et al. |
| 2005/0186459 A1* | 8/2005 | Sugiura ............... H01M 8/0258 429/434 |
| 2007/0015019 A1* | 1/2007 | Baschek ............. H01M 8/0267 429/434 |
| 2009/0098432 A1* | 4/2009 | Rosenberg .............. F28F 13/12 429/444 |
| 2010/0203425 A1 | 8/2010 | Mitsuoka et al. |
| 2010/0316924 A1 | 12/2010 | Sugiura et al. |

FOREIGN PATENT DOCUMENTS

| | | |
|---|---|---|
| EP | 1689013 A1 | 8/2006 |
| WO | 9522179 A1 | 8/1995 |
| WO | 0250935 A2 | 6/2002 |
| WO | 2004107486 A1 | 12/2004 |
| WO | 2009067617 A1 | 5/2009 |

* cited by examiner

BIPOLAR PLATE AND ELECTROCHEMICAL CELL COMPRISING SUCH A BIPOLAR PLATE

BACKGROUND OF THE INVENTION

Field of the Invention

The invention relates to a bipolar plate for electrochemical cells and an electrochemical cell, in particular a fuel cell having such a bipolar plate.

Electrochemical cells are generally known and are subdivided into galvanic cells and electrolytic cells. An electrolytic cell is a device in which an electric current forces a chemical reaction to take place, where at least part of the electrical energy is converted into chemical energy. A galvanic cell is a device—which is complementary to an electrolytic cell—for the spontaneous conversion of chemical energy into electrical energy. A known device of a galvanic cell of this type is a fuel cell, for example, a PEM fuel cell (Proton Exchange Membrane fuel cell or Polymer Electrolyte Membrane fuel cell).

Fuel cells are constantly gaining in significance as part of future-oriented concepts for energy generation. Low temperature fuel cells, in particular, based on Polymer Electrolyte Membrane (PEM) technology, are coming into consideration as environmentally friendly and efficient energy converters for portable, mobile and static uses and are already being put to the first commercial uses.

An essential element of a PEM individual cell is a membrane electrode unit. This consists of two electrodes (an anode and a cathode) and an electrolyte membrane located between the two electrodes. Arranged between the electrodes and the electrolyte membrane is a catalyst layer in which the important physical and electrochemical processes, such as the adsorption of hydrogen and oxygen at the catalyst, the donation and acceptance of electrons and the formation of water takes place on the cathode side by the combination of protons diffused through the membrane and (reduced) oxygen.

In a fuel cell stack, the electrodes are each situated, at the side facing away from the electrolyte membrane or the catalyst layer, in contact with a "bipolar plate". This component has the object of separating the individual fuel cells (on the medium side), of providing for current flow in the cell stack and of removing the heat of reaction. In order to ensure an effective current flow, the bipolar plates are made of an electrically conductive material which must have a low contact resistance in relation to the electrodes.

A bipolar plate is disclosed, for example, by WO 2004/107486 A1. The separator plate or bipolar plate comprises two profiled plate elements which touch one another at contact surfaces and between which a fluid field or flow field for the coolant is formed. The plate elements have a plurality of symmetrically arranged impressions on the surface of the plate elements in the form of round depressions. The impressions of both plate elements are offset relative to one another. A similar arrangement is also known from WO 95/22179. Relatively low flow speeds and a not always optimal distribution of the coolant in the flow field between the plate elements are characteristic of such bipolar plates.

DE 10 2005 057 045 A1 also discloses a bipolar plate having two partial plates, at least one of the partial plates having a uniform arrangement of knob-like raised support points, wherein, beside each raised support point, a similar negative support point is formed. However, the support points of both partial plates are not arranged such that flow channels are defined by means of the support points, but rather, the contact of both the partial plates with one another takes place in the region of the support points, as shown in FIG. 4 of DE 10 2005 057 045 A1.

Further bipolar plates with regular structures on the surface are known from US 2010/0316924 A1, US 2003/0162078 A1 and WO 2006/067617 A1.

BRIEF SUMMARY OF THE INVENTION

It is an object of the invention to enable a particularly uniform perfusion of a bipolar plate for an electrochemical cell.

This object is solved according to the invention by means of a bipolar plate for an electrochemical cell, comprising a flow field arranged between two plate elements with a flow inlet and a flow outlet for a coolant flowing through the flow field, wherein each plate element has a contact plane for contacting the respective other plate element and a plurality of first protrusions projecting from the contact plane and facing away from the respective other plate element, wherein at least one of the plate elements has second protrusions, wherein the first and second protrusions have an aperture toward the contact plane of the plate element, wherein flow channels are formed by means of the apertures of the protrusions in that the protrusions of the two plate elements are offset relative to one another such that each protrusion partially overlaps at least one protrusion of the respective other plate element, and wherein the second protrusions are smaller than the first protrusions, so that the flow channels are constricted or interrupted in the region of the second protrusions.

The object is further solved according to the invention by means of an electrochemical cell, in particular a fuel cell having at least one such bipolar plate. The advantages and preferred embodiments disclosed below in relation to the bipolar plate can be applied accordingly to the electrochemical cell.

The invention is based on the concept of guiding the flow direction of the coolant in a targeted manner in that the shape of the flow channels between the two plate elements is modified by means of the geometry and arrangement of the first and second protrusions. In particular, the flow channels between the two plate elements are constricted or blocked at selected sites so that the coolant necessarily flows round these sites and thus a better distribution of the coolant in the whole network of flow channels is achieved. The "geometry of the protrusions" should be understood herein to mean the size and/or shape of the protrusions. In particular, the majority of the protrusions on the plate elements represent first protrusions such as are formed, as standard, in such plate elements in the field of bipolar plates for electrochemical cells. Protrusions which differ with regard to their size and/or shape from the first protrusions are referred to herein as second protrusions. The "arrangement of the protrusions" should be understood to mean the positioning or distribution of the first and second protrusions relative to one another. In particular, significantly more first protrusions than second protrusions are provided and the second protrusions are arranged between the first protrusions. The second protrusions are, in particular, distributed on the plate element such that a second protrusion or a group of second protrusions is surrounded on at least three sides, in particular on all sides, by first protrusions.

The protrusions of both plate elements are offset relative to one another such that each protrusion of one of the plate elements only partially overlaps at least one first or second protrusion of the other plate element. Flow channels which are part of the flow field therefore extend through the apertures of the protrusions. The large number of flow channels between the flow inlet and the flow outlet form a network of flow channels.

From the design standpoint, a constriction or interruption of the flow channels is achieved in that the apertures of the second protrusions, which are smaller than the apertures of the first protrusions, overlap at least one protrusion of the other plate element which lies opposed and offset thereto only slightly or not at all. Due to the constrictions and interruptions of some of the flow channels, an increased flow speed is achieved in the perfusible flow channels. It is hereby achieved that the flow medium flows at a raised speed through the regions which are otherwise difficult to reach.

Through targeted deflection of the coolant, in particular, bypass flows are generated so that regions which are typically not as readily accessible to the flow medium are also sufficiently perfused by the coolant. In particular, the flow speed of the coolant is increased by this means. A bipolar plate of this type is characterized by an improved gas output or a homogeneous cooling characteristic over the whole area.

Conventionally, the coolant flows via a direct route or along an imaginary connecting line between the flow inlet and the flow outlet and regions which are further removed from the connecting line are less well perfused. The connecting line is defined herein as the shortest route between the flow inlet and the flow outlet of the electrochemical cell and essentially coincides with a main flow direction of the coolant. Advantageously, therefore, the second protrusions are provided in the region of the connecting line between the flow inlet and the flow outlet in order to redirect the coolant to the regions remote from the main flow direction. Suitably also, only first protrusions are provided remote from the connecting line between the flow inlet and the flow outlet, by which means a bypass flow is generated in order to prevent regions of low flow speed in the deflection regions.

With regard to an efficient redistribution of the flow medium, at least one group of two or more spatially closely arranged second protrusions is provided. The more protrusions such a group comprises, the greater is the effect on the spreading of the flow medium or coolant.

According to a preferred variant, the at least one group comprises two or more second protrusions arranged immediately adjacent to one another. According to an alternative, preferred variant, the at least one group is formed by an alternating sequence of first and second protrusions, so that the second protrusions are not positioned directly adjacent to one another, but are each arranged between two second protrusions and one first protrusion. With regard the number and arrangement of the first and second protrusions, further variants are also conceivable which will not be considered in detail herein.

A particularly good cooling characteristic is achieved in that the coolant is guided tortuously in the flow field between the flow inlet and the flow outlet. A simplest form of the tortuous guidance is achieved in that preferably at least two groups of second protrusions are provided, of which one is closer to the flow inlet and one is closer to the flow outlet. Closer to the flow inlet signifies herein that, if the area of the plate elements is divided by a midline between the flow inlet and the flow outlet into two equal halves, this group is situated entirely or at least largely in the half associated with the flow inlet. The same applies for the other group, although in relation to the flow outlet.

With regard to a uniform flow distribution, the second protrusions are preferably symmetrically distributed.

Preferably, only one of the two plate elements of the bipolar plate has second protrusions. The essential advantage therein is that the plate element which has only the first protrusions can be a standard plate element as is used nowadays in fuel cells. Since only one of two plate elements is modified, the manufacturing costs for a bipolar plate as described above are kept as low as possible.

With regard to a technologically simple and cost-effective manufacturing of the protrusions which offers the possibility of modifying the geometry of the protrusions, the protrusions are stamped into in the respective plate element so that both the first and the second protrusions are formed by stamping into the material of the plate element.

Suitably, the first protrusions are configured as knobs with a circular cross-section. In particular, each pair of adjacent knobs have the same spacing from one another. According to a preferred embodiment, the second protrusions are configured as knobs with a semicircular cross-section. The second protrusions, in particular, have the same radius as the first protrusions, although due to the semicircular cross-section thereof, said second protrusions are only half as large as the first protrusions.

BRIEF DESCRIPTION OF THE SEVERAL VIEWS OF THE DRAWINGS

An exemplary embodiment will now be described in greater detail making reference to the drawings, in which.

DESCRIPTION OF THE INVENTION

The same reference signs have the same meaning in the different figures.

Figure 1:
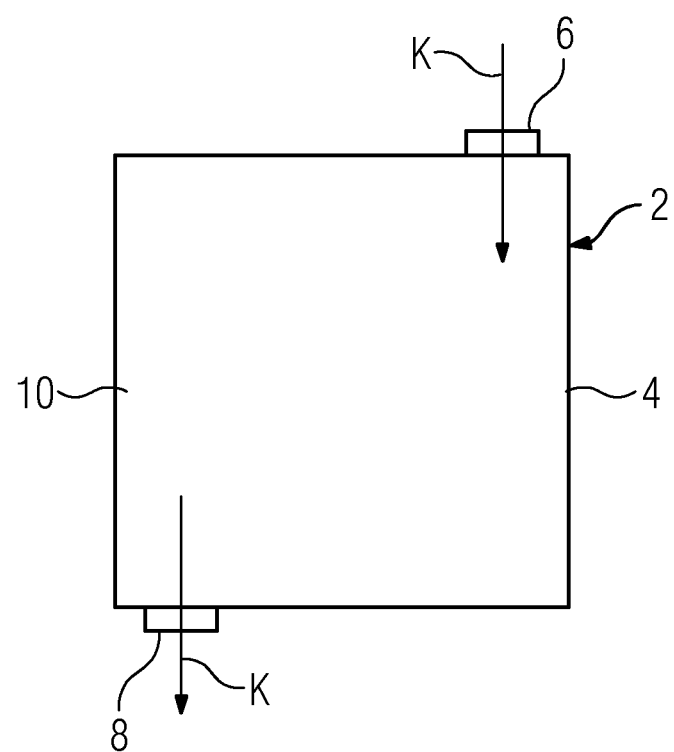
FIG. 1 shows schematically and in a greatly simplified form, a plan view of a bipolar plate.

In FIG. 1, a bipolar plate 2 for a fuel cell (not shown in detail) is shown in a schematic plan view. Provided within the bipolar plate 2 is a flow field 4 for coolant K, in this case, cooling water. Cooling water K is conducted through a flow inlet 6 into the flow field 4 and is fed out through a flow outlet 8 arranged at an opposite side. The flow inlet 6 and the flow outlet 8 lie on a diagonal line (not shown in detail here).

The flow field 4 is delimited on the two flat sides thereof by two plate elements of which only an upper plate element 10 is visible in FIG. 1. The plate element 10 is metallic. The surface of the plate element 10 also has profiling, which is not shown in detail in FIG. 1.

Figure 2:
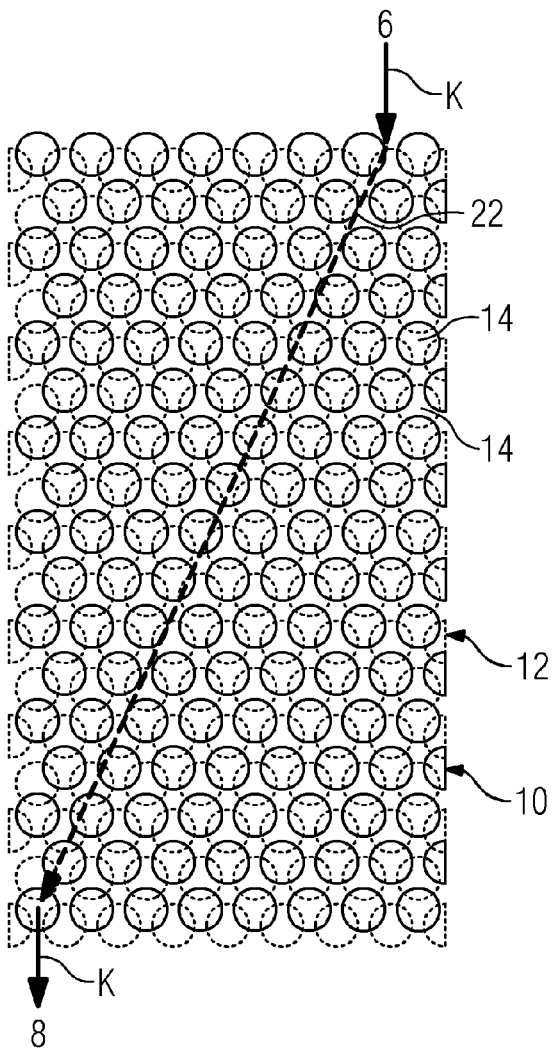
FIG. 2 shows a plan view of two plate elements of a bipolar plate according to the prior art, positioned over one another, in which no targeted flow guidance takes place.
Figure 3:
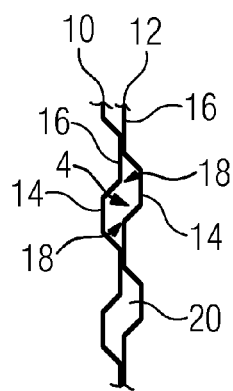
FIG. 3 shows a side view of a section through the bipolar plate of FIG. 2.

The configuration and the arrangement of the plate elements 10, 12 according to the prior art is shown in FIGS. 2 and 3. A large number of knob-shaped protrusions, denoted herein as first protrusions 14, is stamped into the plate elements 10, 12. In FIG. 2, the protrusions 14 of the upper plate element 10 are shown with solid lines, whereas the protrusions 14 of the lower plate element 12 are shown with dashed lines.

As FIG. 3 shows, the protrusions 14 of one of the plate elements 10, 12 face away from the respective other plate element 10, 12. The protrusions according to FIGS. 2 and 3 all have a circular cross-section and are equally sized and symmetrically arranged. Each of the plate elements 10, 12 has a contact plane 16 with which it lies on the other plate element 10, 12 and from which the protrusions 14 extend outwardly. The contact between the two plate elements 10, 12 takes place in the contact plane 16.

The protrusions or knobs 14 stamped into the material of the plate elements 10, 12 are enclosed on three sides but have an aperture 18 toward the contact plane 16. In the assembled state of the bipolar plate 2, the knobs 14 are offset relative to one another. The apertures 18 overlap one another only partially, so that a large number of discrete flow channels 20 for the cooling water K extend through the protrusions 14 in the flow field 4.

Also shown in FIG. 2 is a main flow direction 22 which is essentially shown by the connecting line between the flow inlet 6 and the flow outlet 8.

In order to achieve an improved distribution of the cooling water K in the flow field 4, some protrusions 24 are modified so that the course of the flow channels 20 between the plate elements 10, 12 is changed. This is apparent from FIG. 4. In this regard, second protrusions 24 are provided which, in the exemplary embodiment shown, have a semicircular cross-section.

Figure 4:
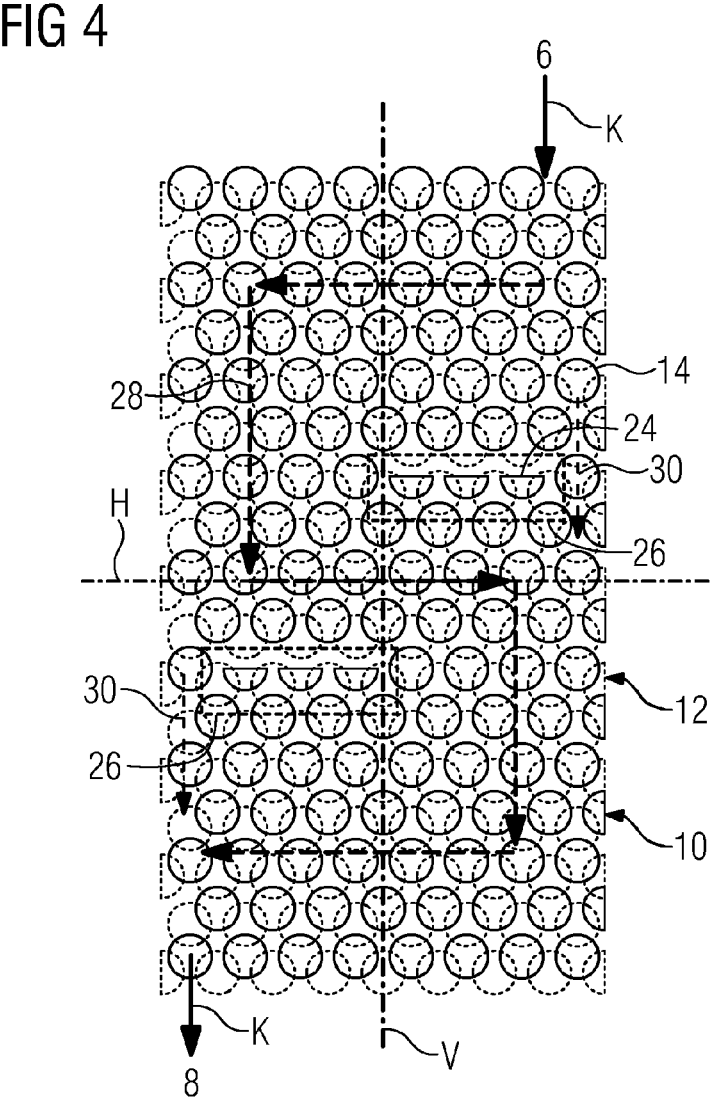
FIG. 4 shows a plan view of two plate elements of a bipolar plate, positioned over one another, with tortuous flow guidance.
Figure 5:
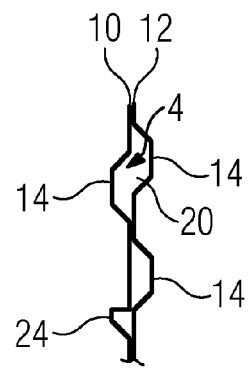
FIG. 5 shows a side view of a section through the bipolar plate of FIG. 4.

According to the exemplary embodiment shown in FIGS. 4 and 5, only the upper plate element 10 has the second semicircular knobs 24, whereas only the circular knobs already known from the prior art are stamped into the lower plate element 12. Due to the changed geometry of the second knobs 24, these no longer overlap the apertures 18 of the first knobs 14 of the lower plate 12 (see FIG. 5). This has the consequence that, at the site of the second knobs 24, the network of flow channels 20 in the flow field 4 is interrupted. By means of the targeted arrangement of the second protrusions 24, the cooling water stream can therefore be diverted between the plate elements 10, 12 in order to achieve a homogeneous cooling characteristic over the whole area of the plate elements 10, 12.

In the exemplary embodiment according to FIG. 4, two groups 26 of, in each case, three immediately adjacently arranged second protrusions 24 are provided. The two groups 26 lie in the region of the main flow direction 22, i.e. they lie in the region of the connecting line between the flow inlet 6 and the flow outlet 8. The groups 26 are oriented, in particular, approximately transversely to the main flow direction 22 and, as a rule, each block (identified with the reference sign 26) encloses an angle of between 0° and 90° with the main flow direction 22. One of the groups 26 is positioned closer to the flow inlet 6 and the other group 26 is positioned closer to the flow outlet 8, wherein both groups 26 are surrounded on all sides by first protrusions 14. This results in an offset of the two groups 26 in relation to a vertical midline V, and in particular, both groups 26 are arranged on the diagonal line between the flow inlet 6 and the flow outlet 8. Furthermore, the two groups 26 are situated on different sides of a horizontal midline H between the flow inlet 6 and the flow outlet 8. The groups 26 are arranged, in particular, with rotational symmetry in relation to an intersection point of the midlines H and V.

Due to the arrangement of the second knobs 24 as described above and shown in FIG. 4, a tortuous guidance of the cooling water between the plate elements 10, 12 results, as is indicated in FIG. 4 by a dashed line 28. Therefore, regions of the flow field 4 which lie remote from the main flow direction 22, particularly the corner regions, are also intensively perfused by the cooling water K. A relatively large pressure drop is herein generated between the flow inlet 6 and the flow outlet 8 and the flow field is constricted, so that the flow speed of the cooling water K is increased. In order to prevent flow dead zones, bypass channels are also provided laterally to the groups 26, as indicated in FIG. 4 by the arrows 30.

By means of the second, modified knobs 24, in particular, an optimized distribution of the cooling water K in the flow field 4 between the plate elements 10, 12 of a bipolar plate 2 is achieved. This can also be easily realized by manufacturing means since only one of the two plate elements 10, 12 is modified and knobs 24 with a modified cross-section are also easy to manufacture.

The invention claimed is:

1. A bipolar plate for an electrochemical cell, the bipolar plate comprising:
    two plate elements;
    a flow field disposed between said two plate elements and having a flow inlet and a flow outlet for a coolant flowing through said flow field;
    each of said plate elements having a contact plane for contacting a respective other one of said plate elements and a plurality of first protrusions projecting from said contact plane and facing away from said respective other plate element between said flow inlet and said flow outlet;
    at least one of said plate elements between said flow inlet and said flow outlet having second protrusions, said first and second protrusions having an aperture formed therein toward said contact plane of said plate elements, wherein flow channels being formed by means of said apertures of said first and second protrusions in that said first and second protrusions of said two plate elements being offset relative to one another such that each of said first and second protrusions only partially overlaps at least one of said first and second protrusions of said respective other plate element;
    said second protrusions being smaller than said first protrusions, so that said flow channels are constricted or interrupted in a region of said second protrusions; and
    said second protrusions disposed in a region of a connecting line between said flow inlet and said flow outlet.

2. The bipolar plate according to claim 1, wherein remote from the connecting line between said flow inlet and said flow outlet, only said first protrusions are provided.

3. The bipolar plate according to claim 1, wherein at least one group of at least two said second protrusions is provided.

4. The bipolar plate according to claim 3, wherein said at least one group contains at least two said second protrusions disposed immediately adjacent to one another.

5. The bipolar plate according to claim 3, wherein said at least one group is formed by an alternating sequence of said first protrusions and said second protrusions.

6. The bipolar plate according to claim 3, wherein said at least one group is one of at least two groups of said second protrusions, one of said at least two groups is closer to said flow inlet and another of said at least two groups is closer to said flow outlet.

7. The bipolar plate according to claim 1, wherein said second protrusions are symmetrically distributed.

8. The bipolar plate according to claim 1, wherein only one of said two plate elements has said second protrusions.

9. The bipolar plate according to claim 1, wherein said first and second protrusions are stamped impressions in a material of said plate elements.

10. The bipolar plate according to claim 1, wherein said first protrusions are configured as knobs with a circular cross-section.

11. The bipolar plate according to claim 1, wherein said second protrusions are knobs with a semicircular cross-section.

12. An electrochemical cell, comprising:
  at least one bipolar plate, containing:
    two plate elements;
    a flow field disposed between said two plate elements and having a flow inlet and a flow outlet for a coolant flowing through said flow field;
    each of said plate elements having a contact plane for contacting a respective other of said plate elements and a plurality of first protrusions projecting from said contact plane and facing away from said respective other plate element between said flow inlet and said flow outlet;
    at least one of said plate elements between said flow inlet and said flow outlet having second protrusions, said first and second protrusions having an aperture formed therein facing toward said contact plane of said plate element, wherein flow channels being formed by means of said apertures of said first and second protrusions in that said first and second protrusions of said two plate elements being offset relative to one another such that each of said first and second protrusions only partially overlaps at least one of said first and second protrusions of said respective other plate element;
  said second protrusions being smaller than said first protrusions, so that said flow channels are constricted or interrupted in a region of said second protrusions; and
  said second protrusions disposed in a region of a connecting line between said flow inlet and said flow outlet.

13. The electrochemical cell according to claim 12, wherein the electrochemical cell is a fuel cell.

* * * * *